United States Patent
Ravi et al.

(10) Patent No.: US 10,718,203 B2
(45) Date of Patent: Jul. 21, 2020

(54) GEOMETRIC SHAPING OF RADIO-FREQUENCY TAGS USED IN WELLBORE CEMENTING OPERATIONS

(71) Applicant: Halliburton Energy Services, Inc., Houston, TX (US)

(72) Inventors: Krishna M. Ravi, Houston, TX (US); Mark W. Roberson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 180 days.

(21) Appl. No.: 15/544,785

(22) PCT Filed: Mar. 16, 2015

(86) PCT No.: PCT/US2015/020732
§ 371 (c)(1),
(2) Date: Jul. 19, 2017

(87) PCT Pub. No.: WO2016/148683
PCT Pub. Date: Sep. 22, 2016

(65) Prior Publication Data
US 2018/0030825 A1    Feb. 1, 2018

(51) Int. Cl.
| | |
|---|---|
| *E21B 47/017* | (2012.01) |
| *G06K 19/07* | (2006.01) |
| *E21B 33/13* | (2006.01) |
| *E21B 47/005* | (2012.01) |
| *E21B 33/14* | (2006.01) |
| *G01V 15/00* | (2006.01) |

(52) U.S. Cl.
CPC ............ *E21B 47/017* (2020.05); *E21B 33/13* (2013.01); *E21B 33/14* (2013.01); *E21B 47/005* (2020.05); *G01V 15/00* (2013.01); *G06K 19/0716* (2013.01); *G06K 19/0717* (2013.01); *G06K 19/0723* (2013.01)

(58) Field of Classification Search
CPC .......................... B81B 7/0058; B81C 1/00238
See application file for complete search history.

(56) References Cited

U.S. PATENT DOCUMENTS

| | | | |
|---|---|---|---|
| 2001/0004085 A1* | 6/2001 | Gueissaz | B81C 1/00293 228/124.6 |
| 2005/0150691 A1 | 7/2005 | Schultz et al. | |

(Continued)

OTHER PUBLICATIONS

Examination Report issued for Australian Patent Appl. No. 2015387246 dated Aug. 30, 2018, 3 pages.

(Continued)

*Primary Examiner* — David J Bagnell
*Assistant Examiner* — Dany E Akakpo
(74) *Attorney, Agent, or Firm* — Haynes and Boone, LLP

(57) ABSTRACT

Radio frequency Micro-Electro-Mechanical System ("MEMS") tags are geometrically shaped using protective structures. The MEMS tags may be added to wellbore cement, and pumped downhole. In addition to protecting the MEMS tags from the harsh downhole environment, the protective structures produce a more rounded shape which, in turns, increases the flow efficiency of the MEMS tags. An interrogation tool may be deployed downhole to interrogate the MEMS tags, to thereby perform a variety of wellbore operations such as assessing the integrity of the cement seal.

17 Claims, 4 Drawing Sheets

(56) References Cited

U.S. PATENT DOCUMENTS

| | | |
|---|---|---|
| 2009/0195390 A1 | 8/2009 | Chou |
| 2010/0224980 A1* | 9/2010 | Chahal .................. B81B 7/007 |
| | | 257/690 |
| 2011/0006120 A1 | 1/2011 | Baba et al. |
| 2011/0189844 A1* | 8/2011 | Pornin ................ B81B 7/0058 |
| | | 438/584 |
| 2011/0199228 A1* | 8/2011 | Roddy .................. E21B 33/13 |
| | | 340/856.4 |
| 2012/0055998 A1 | 3/2012 | Mieslinger |
| 2014/0001270 A1 | 1/2014 | Kikuchi et al. |
| 2014/0111349 A1 | 4/2014 | Roberson et al. |

OTHER PUBLICATIONS

International Search Report and The Written Opinion of the International Search Authority, or the Declaration, dated Dec. 11, 2015, PCT/US2015/020732, 12 pages, ISA/KR.

* cited by examiner

GEOMETRIC SHAPING OF RADIO-FREQUENCY TAGS USED IN WELLBORE CEMENTING OPERATIONS

FIELD OF THE DISCLOSURE

The present disclosure generally relates to downhole completions and, more particularly, to geometrically shaped radio-frequency ("RF") Micro-Electro-Mechanical System ("MEMS") tags utilized in wellbore cementing operations.

BACKGROUND

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus.

Subsequent secondary cementing operations may also be performed. One example of a secondary cementing operation is squeeze cementing, whereby a cement slurry is employed to plug and seal off undesirable flow passages in the cement sheath and/or the casing. Non-cementous sealants are also utilized in preparing a wellbore. For example, polymer, resin, or latex-based sealants may be desirable for placement behind casing.

To enhance the life of the well and minimize costs, sealant slurries are chosen based on calculated stresses and characteristics of the formation to be serviced. Suitable sealants are selected based on the conditions that are expected to be encountered during the sealant service life. Once a sealant is chosen, it is desirable to monitor and/or evaluate the health of the sealant so that timely maintenance can be performed and the service life maximized. The integrity of sealant can be adversely affected by conditions in the well. For example, cracks in cement may allow water influx while acid conditions may degrade cement. The initial strength and the service life of cement can be significantly affected by its moisture content from the time that it is placed. Moisture and temperature are the primary drivers for the hydration of many types of cement and are critical factors in the most prevalent deteriorative processes, including damage due to freezing and thawing, alkali-aggregate reaction, etc.

Accordingly, an ongoing need exists for methods of monitoring wellbore sealant conditions from placement through the service lifetime of the sealant.

DESCRIPTION OF ILLUSTRATIVE EMBODIMENTS

Figure 1:
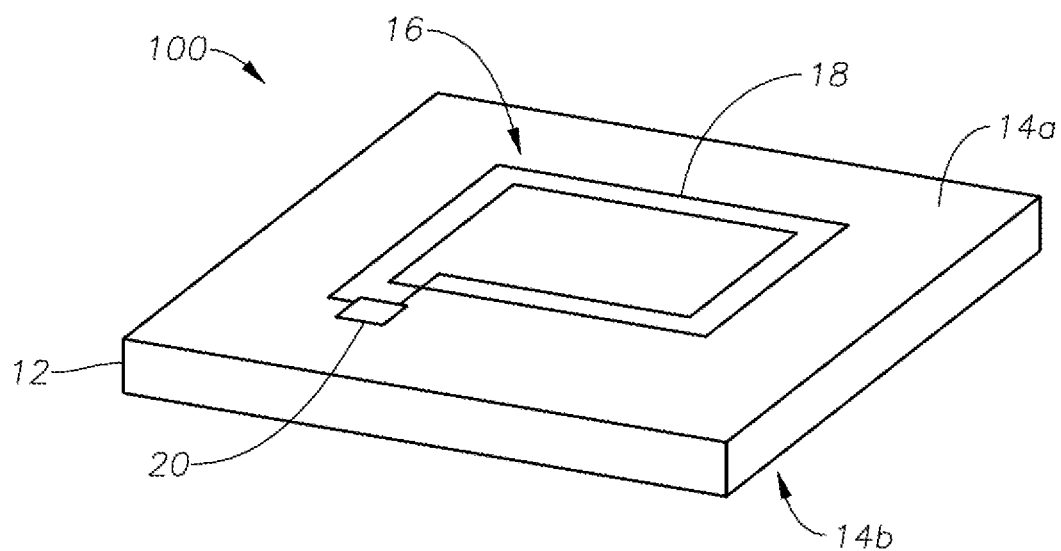
FIG. 1 shows a three-dimensional view of a single MEMS tag, according to certain illustrative embodiments of the present disclosure.

Illustrative embodiments and related methods of the present disclosure are described below as they might be employed in geometrically shaped RF MEMS tags used in cementing operations. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments of the present disclosure are directed to MEMS tags that are geometrically shaped to provide protection and flow efficiency during cementing operations. In a generalized embodiment, the MEMS tag is comprised of a first planar structure having a first and second side. RF circuitry is positioned on the first side of the planar structure, and configured to resonate at a resonant frequency. The first planar structure and RF circuitry result in the MEMS tag having a first geometric shaped (e.g., rectangular). A protective structure is placed atop the circuitry which, in turn, alters the shape of the MEMS tag to a second geometric shape. The protective structure may be another planar structure or a thick-film material having a variety of shapes. In addition to providing protection for the RF circuitry, the protective structure also increases the flow efficiency of the MEMS tag as it flows in the cement slurry during pumping.

In a generalized method, one or more MEMS tags are mixed into a wellbore cement mixture, and the mixture is pumped downhole into the wellbore annulus. The MEMS tags include RF circuitry that resonates at a desired frequency. When pumping is complete (or during pumping), an interrogation tool, which may be deployed downhole or form part of the downhole completion system (e.g., positioned on the casing), interrogates the MEMS tags in the annulus using radio frequency ("RF") signals emitted at the resonant frequency. In turn, the MEMS tags are activated, whereby they interact with the two high resonant frequency RF signals, thereby resulting in a response signal. When the interrogation tool emits the RF signal, the RF circuitry of the MEMS tags will begin to resonant which, in turn, absorbs power from the emitted signal, thus resulting in a response signal having less power than the emitted signal. The interrogation tool can then detect this response signal, which also indicates the presence of the MEMS tag, which in turn may be used to perform a wellbore operation.

FIG. 1 shows a three-dimensional view of a single MEMS tag, according to certain illustrative embodiments of the present disclosure. MEMS tag 100 is comprised of a planar structure 12 having a first side 14a and a second side 14b. MEMS tag 100 may be fabricated using any variety of dicing techniques or other semiconductor fabrication techniques. Planar structure 12 is a low loss tangent structure, such as, for example, a semiconductor substrate (e.g., Si or $SiO_2$), quartz, sapphire, polyethylene, polystyrene or Teflon. Planar structure 12 may take on a variety of dimensions, such as, for example, 500 nanometers thick and 1850 nanometers in length and width. Additionally, the shape of planar structure 12 may be varied, such as, for example, circular or rectangular.

MEMS tag 100 includes RF circuitry that resonates at a resonant frequency. First side 14a of planar structure 12 includes an inductor-capacitor circuit ("LC circuit") 16 which includes an inductor 18 connected to a capacitor 20. Inductor 18 may be comprised of a variety of low resistivity materials, such as, for example, copper. Although not shown, RF circuit 16 may include a thin-film protective layer atop it, such as, for example, Benzocylobutene or another suitable material. The thin-film layer is typically 25 microns or less, and may be formed using a photo-resistive technique, for example. Such a thin-film layer would be useful in providing dust protection, among others. Also, although described as an LC circuit, a variety of other RF circuits may also be utilized, as will be understood by those ordinarily skilled in the art having the benefit of this disclosure. Planar structure 12 and RF circuitry 16 are considered herein as having a "first geometric shape."

For MEMS tags placed in the fluids around a casing in borehole applications, the geometric shape is a critical parameter. Generally, a rounded shape is desirable because such shapes flow more freely in the downhole environment. Thus, due to the geometric shape of MEMS tag 100, it may not flow as efficiently as desired. Accordingly, in the illustrative embodiments described herein, the geometric shape of MEMS tag 100 is altered to a "second geometric shape" which increases the flow efficiency of the MEMS tag. Additionally, the protective structure described below also provides protection for the RF circuitry, while maintaining the RF performance of the circuit.

Figure 2:
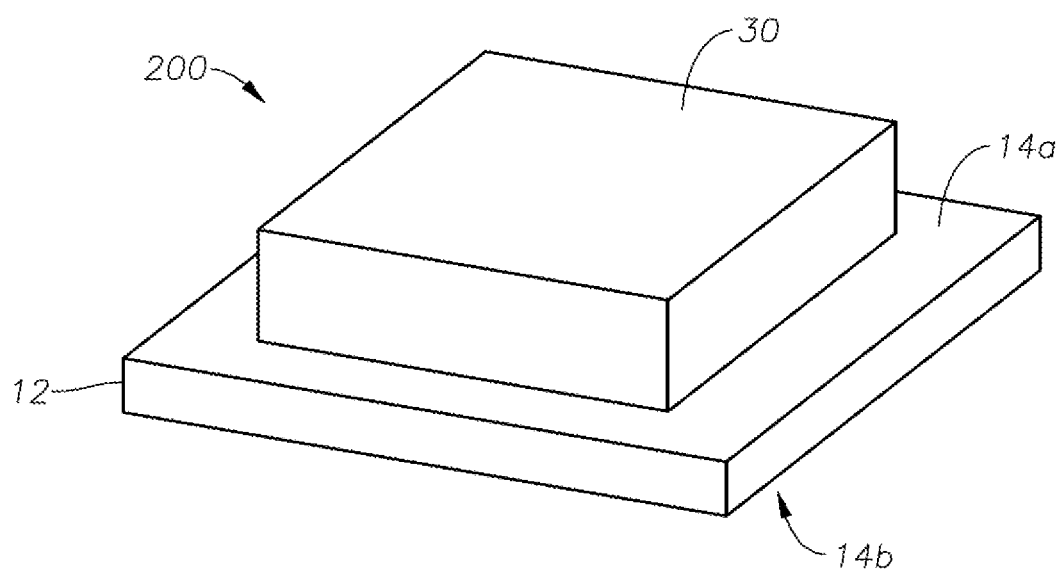
FIG. 2 is a three-dimensional view of a geometrically shaped MEMS tag, according to certain illustrative embodiments of the present disclosure.

FIG. 2 is a three-dimensional view of a geometrically shaped MEMS tag, according to certain illustrative embodiments of the present disclosure. MEMS tag 200 includes a planar structure 12 having first side 14a and second side 14b, just as described in relation to MEMS tag 100 of FIG. 1. Although not shown, planar structure 12 also includes the RF circuitry which combines to form its first geometric shape. In addition, however, MEMS tag 200 further includes a protective structure 30 placed atop RF circuit 16. As shown, planar structure 12, the RF circuit, and protective structure 30 form a second geometric shape which provides the flow efficiencies and protection described herein. In order to avoid any attenuation of RF communications by the RF circuitry, protective structure 30 may be made of the same material as planar structure 12, or some other low loss tangent material.

In certain illustrative embodiments, protective structure 30 may be a non-functioning cap having any variety of shapes, such as, for example, square, rectangular, having dimensions the same as or different from planar structure 12, etc. In the illustrated embodiment, however, protective cap 30 is a smaller second planar structure attached to first side 14a of planar structure 12. Any variety of attachment methods may be utilized, such as, for example, epoxy, adhesives, solder pads, or metallurgic bonding. In other embodiments, however, protective structure 30 may have the same dimensions as planar structure 12, or may even be larger. Nevertheless, due to the more rounded shape of MEMS tag 200 afforded by protective structure 30, MEMS tag 200 will efficiently flow during downhole operations. Also, protective structure 30 acts to protect the RF circuitry from the harsh temperatures and pressures that exist in the downhole environment.

Figure 3A:
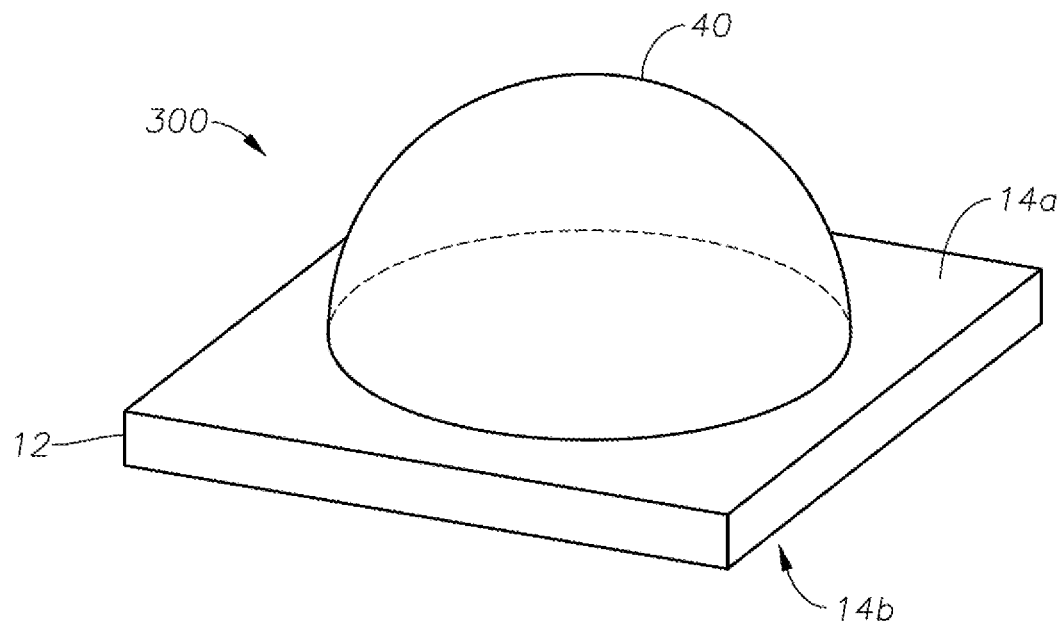
FIGS. 3A and 3B are three-dimensional views of another geometrically shaped MEMS tag, according to certain alternative embodiments of the present disclosure.
Figure 3B:
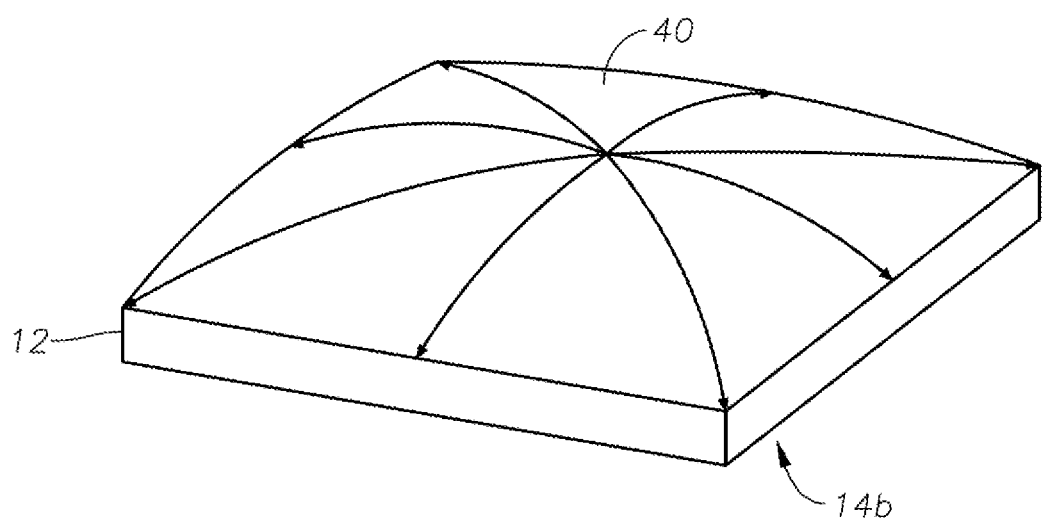

FIGS. 3A and 3B are three-dimensional views of another geometrically shaped MEMS tag, according to certain alternative embodiments of the present disclosure. As with previous embodiments, MEMS tag 300 includes planar structure 12 having first side 14a and second side 14b. Although not shown, planar structure 12 also includes RF circuitry which, along with planar structure 12, forms a first geometric shape. However, MEMS tag 300 further includes a protective structure 500 which, in this example, is a thick-film material 40. Thick-film material 40 may be a variety of materials, such as, for example, epoxy, resin, etc., having a thickness of 100 microns or more.

In this example, thick-film material 40 is a material deposited to planar structure 12 which can flow under certain temperature and/or processing properties, also referred to herein as having "flow characteristics." In other words, thick-film material 40 is applied as a droplet-like shape using, for example, a pump-driven needle, jet dispenser or other suitable dispensing system. When certain temperatures and/or other processes are applied to the droplet shaped thick-film material, it begins to flow outwardly toward the edges of planar structure 12. Such processes may include, for example, a controlled time and temperature profile in the controlled presence of oxygen and/or any surface tension modifying agents, such as surfactants or plasma assisted surface tension modification. Nevertheless, FIG. 3B illustrates this flow characteristic. Because of the surface tension caused by the interaction of the surface cohesion of thick-film material 40 and the adhesion of planar structure 12, thick-film material forms a rounded shape atop the RF circuitry as it flows toward the edges of planar structure 12 (flow characteristics are shown by the arrows in FIG. 3B).

The MEMS tags described herein may take on a variety of alterations. For example, RF circuits may be placed on both sides (14a and 14b) of the planar structures, and protective structures are then placed atop both RF circuits. Here, for example, side 14b (i.e., second side) may have a second RF circuit having another protective structure placed atop it. Also, multiple RF circuits may be placed on both sides of the planar structures, and protective structures placed atop the circuits accordingly. In yet other embodiments, for ease of assembly, thick-film material 40 may be deposited before dicing of the wafer upon which it resides. In other embodiments, the wafer can be partially diced before the application of the thick-film material.

Figure 4:
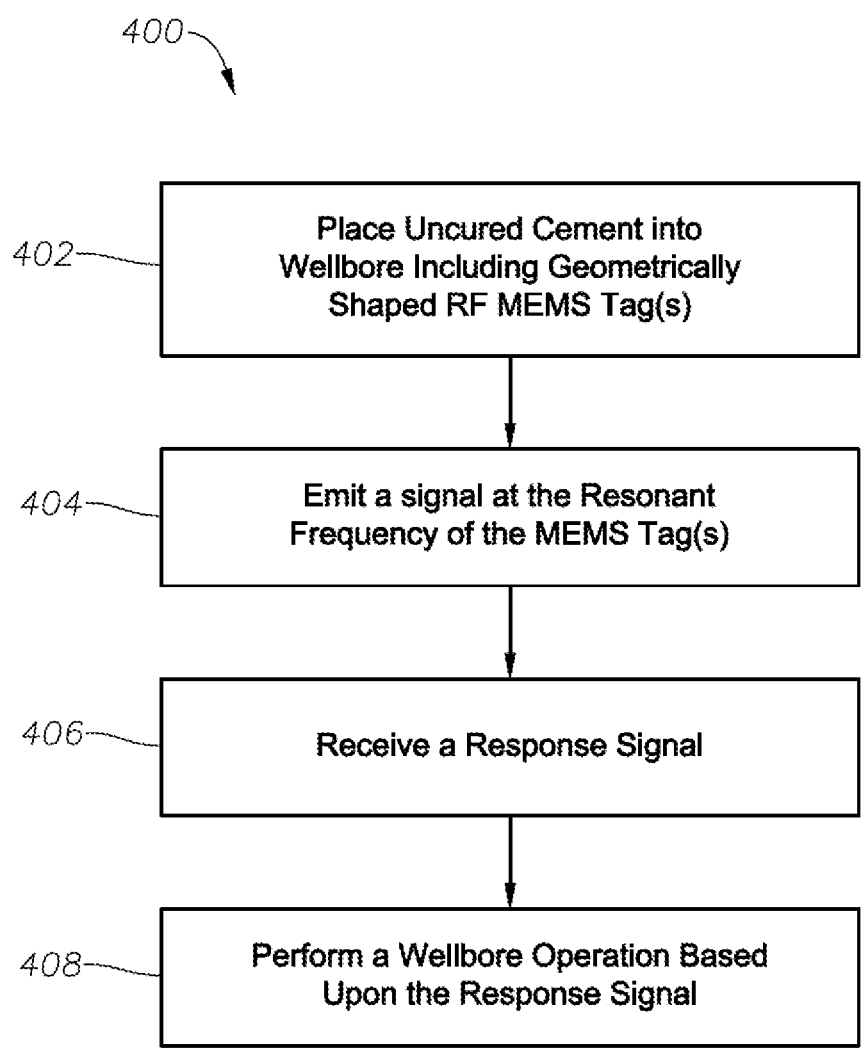
FIG. 4 is a flow chart of a method for placing geometrically shaped MEMS tags in a wellbore and gathering data, according to certain illustrative methods of the present disclosure.

Now that illustrative embodiments of the MEMS tags have been described, applications in which they can be utilized will be described. Although the geometrically shaped RF MEMS tags can be used in a variety of applications, the following description will focus on wellbore applications. Discussion of an illustrative method of the present disclosure will now be made with reference to FIG. 4, which is a flow chart of a method for placing geometrically shaped RF MEMS tags in wellbore cement and gathering data. Although described below with reference to cement mixtures, the MEMS tags may also be mixed into other downhole fluids.

To begin the method, one or more geometrically shaped RF MEMS tags are added to a mixture of cement, and the cement is placed into the wellbore at block 402. In certain embodiments, the MEMS tags may be mixed with a dry material, mixed with one more liquid components (e.g., water or a non-aqueous fluid), or combinations thereof. The mixing may occur onsite, for example addition of the MEMS tags into a bulk mixer such as a cement slurry mixer. The MEMS tags may be added directly to the mixer, may be added to one or more component streams and subsequently fed to the mixer, may be added downstream of the mixer, or combinations thereof.

As the cement is pumped downhole at block 402, the MEMS tags are positioned within the wellbore. For example, the MEMS tags may extend along all or a portion of the length of the wellbore adjacent the casing (e.g., casing/wellbore annulus). The cement may be placed downhole as part of a primary cementing, secondary cementing, or other sealant operation. At block 404, a data interrogator tool is positioned in an operable location to gather data from the MEMS tags, for example lowered within the wellbore proximate the MEMS tags or already positioned downhole as part of the completion (e.g., on casing string).

The data interrogator tool interrogates the MEMS tags (e.g., by emitting an RF signal at the resonant frequency of the MEMS tags) at block 404. The MEMS tags are thereby activated to interact with the resonant frequency, as previously described, whereby the response signals are received by the interrogation tool at block 406. Once the response signal(s) has been received, the interrogation tool communicates the resonant frequency response signals to one or more computer components (e.g., memory and/or microprocessor) that may be located within the tool, at the surface, or both. At block 408, the response signals may be used locally or remotely from the tool to perform one or more wellbore operations. For example, the location of each MEMS tag can be determined and correlated to the data received (the response signals may carry a variety of data) in order to evaluate cement sealant integrity or the location of certain fluids.

In certain illustrative embodiments, the MEMS tags described herein are passive sensors that do not require continuous power from a battery or an external source in order to transmit real-time data over the resonant frequencies. The MEMS tags are micro-electromechanical systems comprising one or more (and typically a plurality of) mechanical features on the micrometer scale. In addition to the LC circuits described herein, the MEMS tags may embody the integration of mechanical elements, sensors, actuators, and electronics on a common substrate. In embodiments, the substrate may comprise quartz.

In certain illustrative embodiments, as previously described, the MEMS tags comprise passive (remain unpowered when not being interrogated) sensors energized by energy radiated from a data interrogation tool. The data interrogation tool, which may be a deployed tool or form part of the downhole completion itself, may comprise an energy transceiver sending energy (e.g., RF waves) to the MEMS tags and receiving response signals, as well as a processor for processing the received signals. The data interrogation tool may further comprise a memory component, a communications component, or both. The memory component may store raw and/or processed data received from the MEMS tags, and the communications component may transmit raw data to the processor and/or transmit processed data to another receiver, for example located at the surface.

Figure 5:
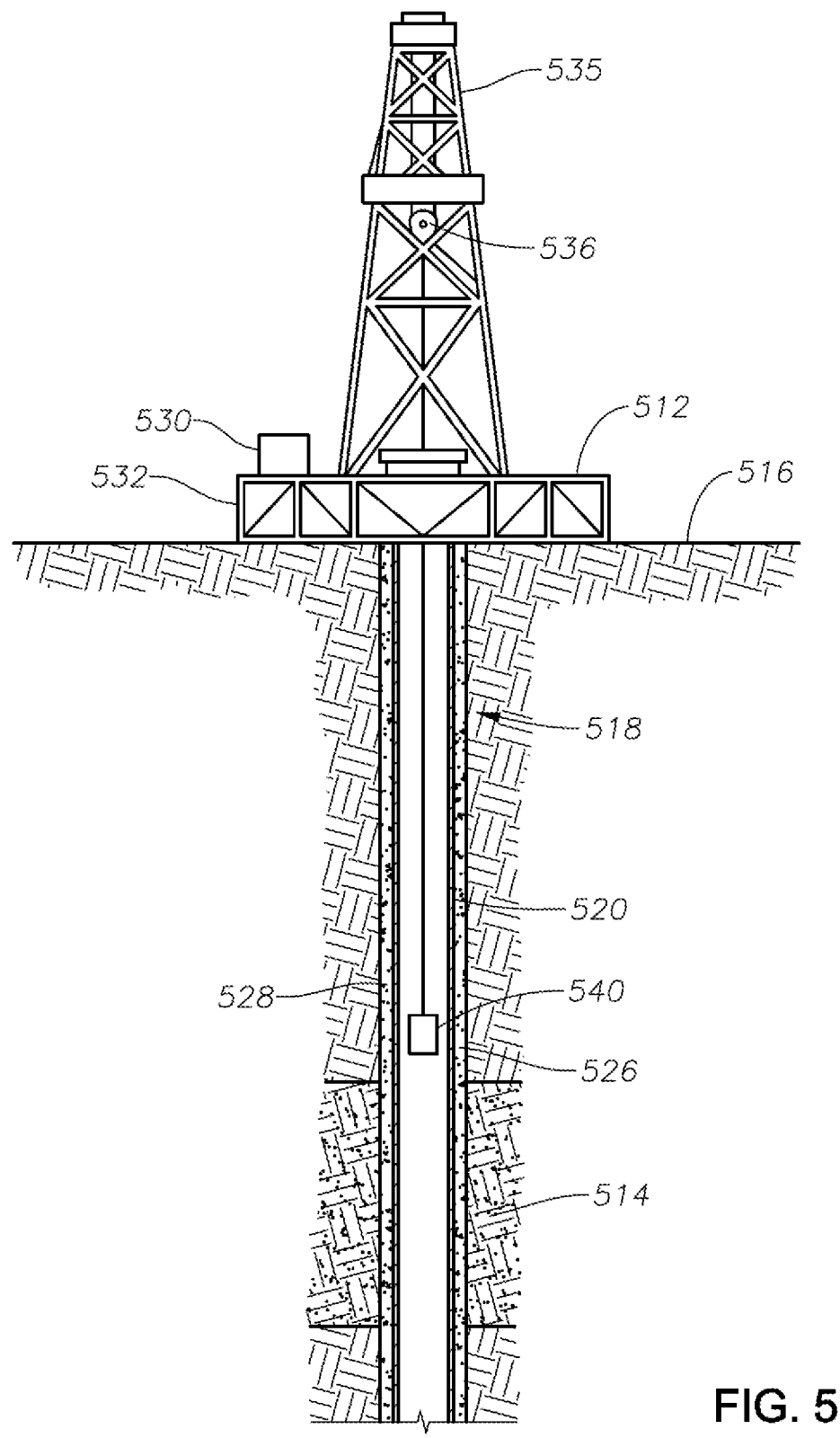
FIG. 5 shows an onshore oil or gas drilling rig and wellbore application in which embodiments of the present disclosure may be used.

FIG. 5, which shows an onshore oil or gas drilling rig and wellbore, will be used to further describe illustrative methods of the present disclosure. Rig 512 is centered over a subterranean oil or gas formation 514 located below the earth's surface 516. Rig 512 includes a work deck 532 that supports derrick 534. Derrick 534 supports a hoisting apparatus 536 for raising and lowering pipe strings such as casing 520. Pump 530 is capable of pumping a variety of wellbore compositions (e.g., drilling fluid or cement) into the well and includes a pressure measurement device that provides a pressure reading at the pump discharge.

Wellbore 518 has been drilled through the various earth strata, including formation 514. Upon completion of wellbore drilling, casing 520 is placed in wellbore 518 to facilitate the production of oil and gas from formation 514. Casing 520 is a string of pipes that extends down wellbore 518, through which oil and gas will eventually be extracted. The region between casing 520 and the wall of wellbore 518 is known as the casing annulus 526. To fill up casing annulus 526 and secure casing 520 in place, casing 520 is usually "cemented" in wellbore 518, which is referred to as "primary cementing." A data interrogation tool 540 is shown in wellbore 518, however in other embodiments interrogation tool 540 may be positioned along casing 520 or otherwise positioned downhole.

In certain illustrative embodiments of the present disclosure, the MEMS tags may be used for monitoring primary cement during and/or subsequent to a conventional primary cementing operation. In this conventional primary cementing embodiment, MEMS tags are mixed into an uncured cement slurry, and the uncured cement slurry is then pumped (by pump 530) down the inside of casing 520. As the slurry reaches the bottom of casing 520, it flows out of casing 520 and into casing annulus 526 between casing 520 and the wall of wellbore 518. As cement slurry 528 flows up annulus 526, it displaces any fluid in the wellbore. To ensure no cement remains inside casing 520, devices called "wipers" may be pumped by a wellbore servicing fluid (e.g., drilling mud) through casing 520 behind cement slurry 528. The wiper contacts the inside surface of casing 520 and pushes any remaining cement out of casing 520. When cement slurry 528 reaches the earth's surface 516, and annulus 526 is filled with slurry, pumping is terminated and the cement is allowed to cure/set.

During cementing, or subsequent to the setting of cement slurry 528, data interrogation tool 540 may be positioned in wellbore 518. For example, the wiper may be equipped with a data interrogation tool and may read the RF data from the MEMS tags while being pumped downhole and transmit the same to the surface. Alternatively, an interrogation tool may be run into the wellbore following completion of cementing a segment of casing, for example as part of the drill string during resumed drilling operations. Alternatively, the interrogator tool may be run downhole via a wireline or other conveyance (e.g., logging-while-drilling assembly), or may form a permanent part of casing 520.

Nevertheless, data interrogation tool 540 may then be signaled to interrogate the MEMS tags along annulus 526 using the RF signals. As previously described, the MEMS tags will interact with the emitted signals to generate response signals which may be used to perform a variety of wellbore operations, such as, for example, determining the location of the MEMS tags (and cement) which also indicates cement seal integrity. Data interrogation tool 540 communicates the response signal data to a local or remote processor, whereby the MEMS tag (and likewise cement slurry) position and cement integrity may be determined.

In other wellbore operations, the response signal data may reveal conditions that may be adverse to cement curing, such as, for example, temperature profiles. Alternatively, such data may indicate a zone of reduced, minimal, or missing MEMS tags, which would indicate a loss of cement corresponding to the area (e.g., a loss/void zone or water influx/washout). Moreover, such methods may be used with various other cement techniques, such as, for example, reverse primary cementing.

Embodiments described herein further relate to any one or more of the following paragraphs:

1. A Micro-Electro-Mechanical System ("MEMS") tag, comprising: a first planar structure having a first side and a second side opposite the first side; circuitry positioned on the first side of the first planar structure, the circuitry being configured to resonate at a resonant frequency, whereby the first planar structure and the circuitry form a first geometric shape; and a protective structure placed atop the circuitry, whereby the first planar structure, circuitry, and protective structure form a second geometric shape different from the first geometric shape.

2. A MEMS tag as defined in paragraph 1, wherein the protective structure is a second planar structure.

3. A MEMS tag as defined in paragraphs 1 or 2, wherein the second planar structure is smaller than the first planar structure.

4. A MEMS tag as defined in any of paragraphs 1-3, wherein the second planar structure comprises dimensions similar to dimensions of the first planar structure.

5. A MEMS tag as defined in any of paragraphs 1-4, wherein the protective structure is a thick-film material having a thickness of 100 or more microns.

6. A MEMS tag as defined in any of paragraphs 1-5, wherein the thick-film material comprises flow characteristics such that the thick-film material forms a rounded shape atop the circuitry.

7. A MEMS tag as defined in any of paragraphs 1-6, wherein the second side comprises a second circuitry and a protective structure top the second circuitry.

8. A MEMS tag as defined in any of paragraphs 1-7, wherein the protective structure is a non-functioning cap.

9. A MEMS tag as defined in any of paragraphs 1-8, wherein the protective structure has a square or rectangular shape.

10. A MEMS tag as defined in any of paragraphs 1-9, wherein the MEMS tag comprises part of a wellbore cement mixture.

11. A method of using a Micro-Electro-Mechanical System ("MEMS") tag as defined in any of paragraphs 1-10, the method comprising: placing cement into a wellbore, the cement comprising one or more of the MEMS tags; emitting a signal into the wellbore at the resonant frequency, wherein the signal interacts with the MEMS tags to produce a response signal; receiving the response signal; and utilizing the response signal to perform a wellbore operation.

12. A method as defined in paragraph 11, wherein the wellbore operation is at least one of: determining a location of the MEMS tags; or determining a seal integrity of the cement.

13. A method as defined in paragraphs 11 or 12, wherein: the MEMs tags are mixed into the cement using a mixer; and the cement is placed into the wellbore using a pump.

14. A method for manufacturing a Micro-Electro-Mechanical System ("MEMS") tag, the method comprising: providing a first planar structure having a first side and a second side opposite the first side; providing circuitry on the first side of the first planar structure, the circuitry being configured to resonate at a resonant frequency, whereby the first planar structure and the circuitry form a first geometric shape; and providing a protective structure atop the circuitry, whereby the first planar structure, circuitry, and protective structure form a second geometric shape different from the first geometric shape.

15. A method as defined in paragraph 14, wherein the protective structure is provided as a second planar structure.

16. A method as defined in paragraphs 14 or 15, wherein the second planar structure comprises dimensions that are smaller than the first planar structure.

17. A method as defined in any of paragraphs 14-16, wherein the second planar structure comprises dimensions similar to dimensions of the first planar structure.

18. A method as defined in any of paragraphs 14-17, wherein the protective structure is provided as a thick-film material having a thickness of 100 or more microns.

19. A method as defined in any of paragraphs 14-18, wherein providing the thick-film material comprises: applying the thick-film material as a droplet-like shape having flow characteristics; and allowing the droplet-shaped material to flow toward edges of the first planar structure, whereby a rounded shape of formed atop the circuitry.

20. A method as defined in any of paragraphs 14-19, wherein allowing the droplet-shaped material to flow comprises applying a temperature to the droplet-shaped material.

Although various embodiments and methodologies have been shown and described, the disclosure is not limited to such embodiments and methodologies and will be understood to include all modifications and variations as would be apparent to one skilled in the art. For example, in addition to the wellbore operations described herein, the illustrative MEMS tags described herein may also be used in non-wellbore applications in which knowledge of the position, integrity, etc. of cement or other fluids is desired. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A Micro-Electro-Mechanical System ("MEMS") tag, comprising:
   a first planar structure having a first side and a second side opposite the first side;
   circuitry positioned on the first side of the first planar structure, the circuitry being configured to resonate at a resonant frequency, whereby the first planar structure and the circuitry form a first geometric shape; and
   a protective structure placed atop the circuitry, whereby the first planar structure, circuitry, and protective structure form a second geometric shape different from the first geometric shape,
   wherein the protective structure is a thick-film material having flow characteristics such that the thick-film material forms a rounded shape atop the circuitry.

2. A MEMS tag as defined in claim 1, wherein the protective structure is a second planar structure.

3. A MEMS tag as defined in claim 2, wherein the second planar structure comprises dimensions that are smaller than the first planar structure.

4. A MEMS tag as defined in claim 2, wherein the second planar structure comprises dimensions larger than the first planar structure.

5. A MEMS tag as define din claim 1, wherein the thick-film material has a thickness of 100 or more microns.

6. A MEMS tag as defined in claim 1, wherein the second side comprises a second circuitry and a protective structure top the second circuitry.

7. A MEMS tag as defined in claim 1, wherein the protective structure has a square or rectangular shape.

8. A MEMS tag as defined in claim 1, wherein the MEMS tag comprises part of a wellbore cement mixture.

9. A method of using a Micro-Electro-Mechanical System ("MEMS") tag as defined in claim 1, the method comprising:
   placing cement into a wellbore, the cement comprising one or more of the MEMS tags;
   emitting a signal into the wellbore at the resonant frequency, wherein the signal interacts with the MEMS tags to produce a response signal;
   receiving the response signal; and
   utilizing the response signal to perform a wellbore operation.

10. A method as defined in claim 9, wherein the wellbore operation is at least one of:
    determining a location of the MEMS tags; or
    determining a seal integrity of the cement.

11. A method as defined in claim 9, wherein:
    the MEMs tags are mixed into the cement using a mixer; and
    the cement is placed into the wellbore using a pump.

12. A method for manufacturing a Micro-Electro-Mechanical System ("MEMS") tag, the method comprising:
    providing a first planar structure having a first side and a second side opposite the first side;
    providing circuitry on the first side of the first planar structure, the circuitry being configured to resonate at a resonant frequency, whereby the first planar structure and the circuitry form a first geometric shape; and
    providing a protective structure atop the circuitry, whereby the first planar structure, circuitry, and protective structure form a second geometric shape different from the first geometric shape, wherein the protective structure is provided as a thick-film material, and wherein providing the thick-film material comprises:
    applying the thick-film material to the first planar structure as a droplet-like shape having flow characteristics; and
    allowing the droplet-shaped material to flow toward edges of the first planar structure, whereby a rounded shape is formed atop the circuitry.

13. A method as defined in claim 12, wherein the protective structure is provided as a second planar structure.

14. A method as defined in claim 13, wherein the second planar structure comprises dimensions that are smaller than the first planar structure.

15. A method as defined in claim 13, wherein the second planar structure comprises dimensions that are larger than the first planar structure.

16. A method as defined in claim 13, wherein the thick-film material has a thickness of 100 or more microns.

17. A method as defined in claim 12, wherein allowing the droplet-shaped material to flow comprises applying a temperature to the droplet-shaped material after the droplet-shaped material has been applied to the first planar structure.

* * * * *